Jan. 13, 1970     O. J. POUPITCH     3,488,911
METHOD AND APPARATUS FOR PRODUCING A COVERED TOP CONTAINER
Original Filed Sept. 23, 1965     3 Sheets-Sheet 1
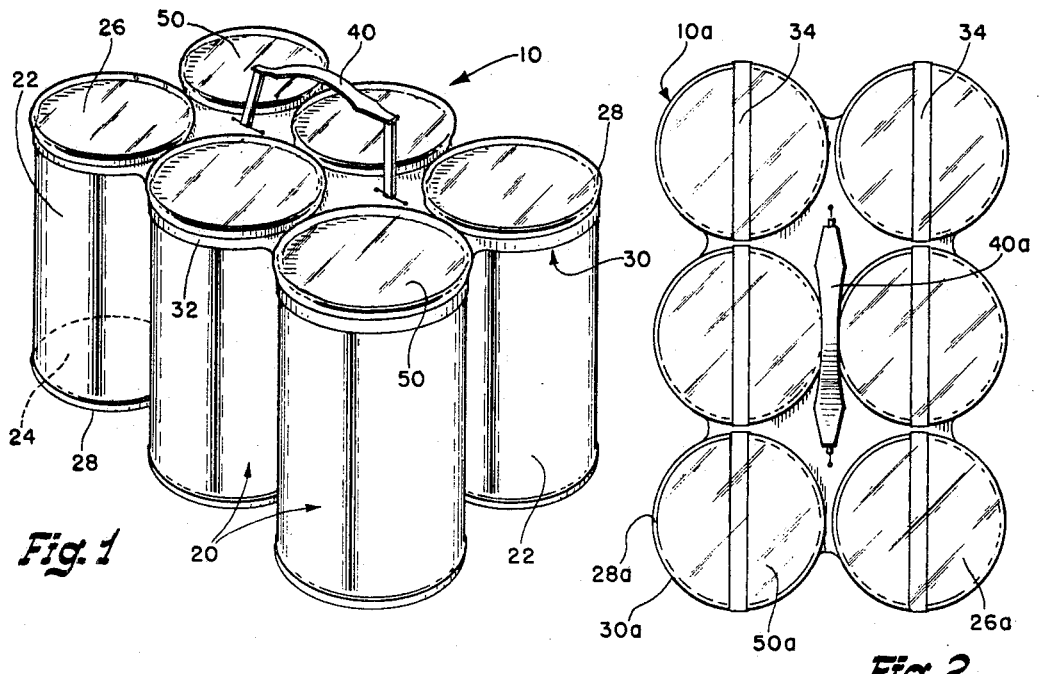
Fig. 1
Fig. 2
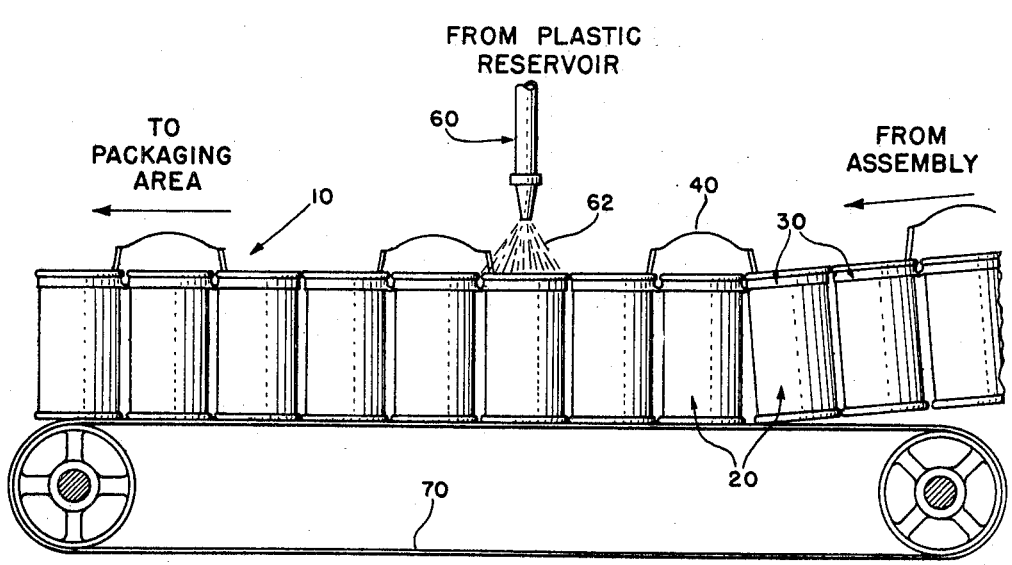
Fig. 3
INVENTOR.
Ougljesa Jules Poupitch
BY
His Att'ys

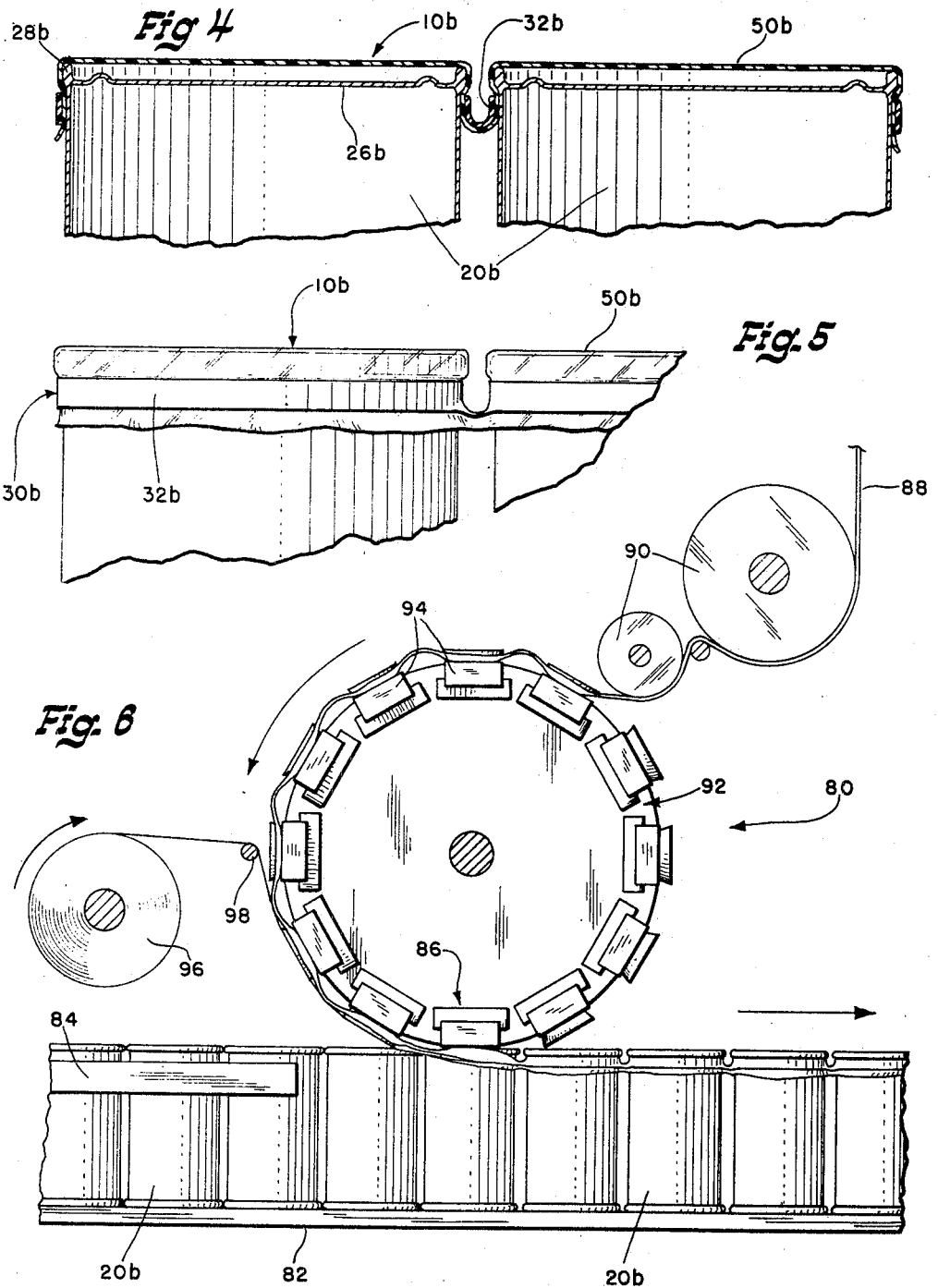

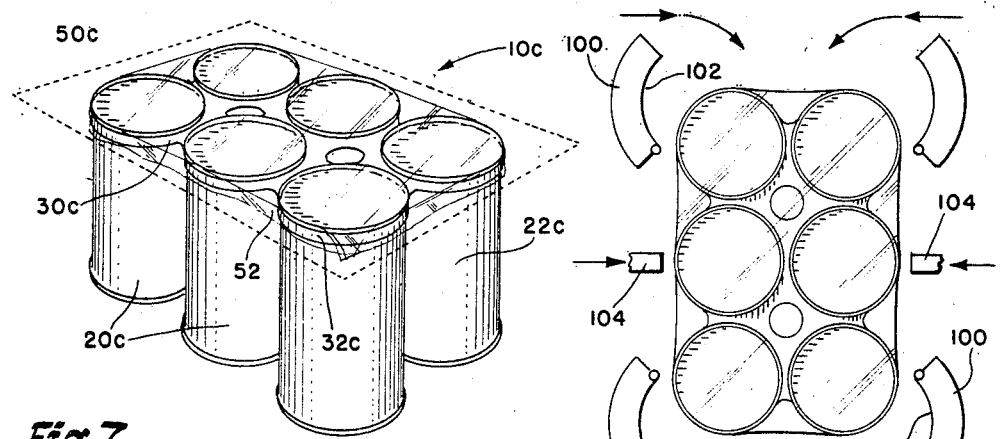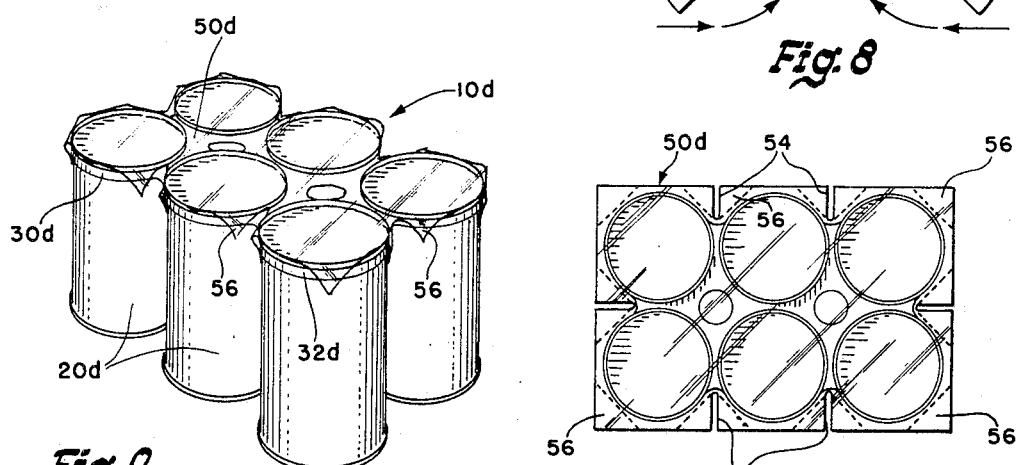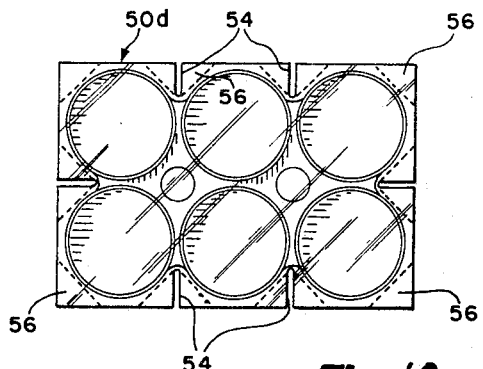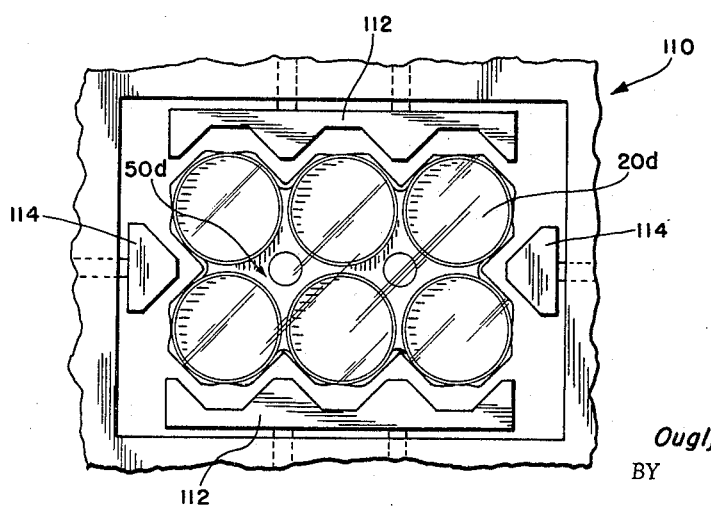

United States Patent Office 3,488,911
Patented Jan. 13, 1970

---

3,488,911
METHOD AND APPARATUS FOR PRODUCING A COVERED TOP CONTAINER
Ougljesa Jules Poupitch, Itasca, Ill., assignor to Illinois Tool Works Inc., Chicago, Ill., a corporation of Delaware
Original application Sept. 23, 1965, Ser. No. 489,670, now Patent No. 3,355,013. Divided and this application Sept. 5, 1967, Ser. No. 665,427
Int. Cl. B65b 15/00, 27/04, 33/00
U.S. Cl. 53—27                                    8 Claims

ABSTRACT OF THE DISCLOSURE

Method and apparatus for producing a covered top container package wherein cover means and carrier elements are separately positioned relative to the upper ends of containers only immediately prior to assembly of the carrier elements and cover means relative to the package to provide a container carrier package.

---

This is a divisional of patent application Ser. No. 489,670, filed Sept. 23, 1965, now U.S. Patent No. 3,355,013.

The present invention concerns itself with improvements in container packages of the type shown in my Patent No. 2,874,835. The packages as shown in this patent include a plurality of containers, usually six in number, which are secured together as a unit by an apertured plastic sheet carrier designed to resiliently grip and engage the containers beneath an enlarged bead or rim on each container to prevent container withdrawal. Removal of the containers from the plastic sheet carrier is easily effected by simply twisting or camming the containers out of the apertures of the carriers.

The many advantages of these plastic sheet carriers, as brought out in detail in my aforementioned patent, have made wide commercial acceptance possible. The present invention complements plastic sheet carriers of the foregoing type by disclosing various ways in which a covered top container package may be produced while retaining all of the advantages that accrue to such plastic sheet carriers. Cover tops for containers are employed where it is desired to protect the tops of containers from dirt, dust and other foreign matter which can be lodged within or around the peripheral bead or rim provided on containers.

It should be mentioned that I have developed other types of covered top plastic sheet carriers as shown in patent applications identified as Ser. No. 827,747 filed July 17, 1959, now Patent No. 3,331,500. and Ser. No. 827,748 also filed July 17, 1959, now Patent No. 3,199,908. The covered top container packages shown in these last mentioned patents each comprise a unitary carrier structure for both holding containers as well as covering the tops thereof. Where a unitary carrier structure is used, the carrier devices will be more expensive since more material is used in their production. The present invention is designed to achieve substantially the same overall result as these last mentioned patents, but in a novel and different manner, and is specifically an improvement over the container packages shown in my U.S. Patent No. 2,874,835.

An object of the present invention is the provision of a covered top container package including a container carrying device with separate cover means which can be easily applied and/or assembled to each other in a fast and efficient manner either during or after assembly of the carrying device with the containers without extensive modification of existing carrier applying equipment.

Still a further object of the present invention is the provision of a method and apparatus for applying composite container carrying devices and cover means to a group of containers without detracting to any great extent, from the speed or efficiency with which container carrying packages have heretofore been produced.

Other objects and advantages will become apparent from the following description when read in connection with the accompanying drawings wherein:

FIG. 1 is a perspective view of one form of covered top container package constructed in accordance with the principles of the present invention;

FIG. 2 is a top plan view of a modified form of container package;

FIG. 3 is a semi-diagrammatic view showing the manner in which a cover top may be formed on a container package of the type shown in FIGS. 1 and 2;

FIG. 4 is a fragmentary enlarged sectional view of a modified form of covered top container package coming within the purview of the present invention;

FIG. 5 is an enlarged fragmentary side elevational view further illustrating a container package of the type shown in FIG. 4;

FIG. 6 is a side elevational view showing the manner of and apparatus for assembling covered top container packages of the type shown in FIGS. 4–5;

FIG. 7 is a perspective view of a further modified form of covered top container package within the teachings of the present invention;

FIG. 8 is a top plan view illustrating a method and apparatus for assembling a cover top or shield on the container package shown in FIG. 7;

FIG. 9 is a perspective view of yet another modified form of covered top container package constructed in accordance with the teachings of the present invention;

FIG. 10 is a top plan view of the container package shown in FIG. 9 prior to assembly of the cover sheet thereto; and FIG. 11 is a fragmentary top plan view of a method and apparatus for assembling the cover sheet seen in FIG. 10 to form the ultimate package construction illustrated in FIG. 9.

As previously indicated, the container package of the present invention employs a covered top or shield as a complement to a plastic sheet carrier of the type shown in my aforementioned U.S. Patent No. 2,874,835. Such carriers or receptacle members each comprise a flat sheet of plastic material which is provided with a plurality of spaced apertures, preferably six in number. Each aperture is somewhat smaller than the diameter of a container with which the carrier or receptacle device is to be assembled, and by making the carrier or receptacle device from a resilient, elastic and deformable material, polyethylene being one preferred example, the surrounding material adjacent each of the apertures will stretch and deform when the containers are inserted in the carrier apertures. In its ultimate position, the material adjacent each of the apertures is deflected upwardly into an axially extending, embracing portion which resiliently and aggressively grips the containers, preferably beneath the enlarged bead or rim thereof, to hold a plurality of containers together as a unit and resist container withdrawal.

As set forth in detail in my aforementioned patent, this arrangement provides a very desirable container package which prevents inadvertent or accidental separation of the containers and carriers from each other while requiring very little force in removing containers from the carriers if separation is performed by twisting or camming the bead or rim of the container past the embracing portion. Consistent with the principles in my aforementioned patent, it is of course possible to perform the axially extending embracing portion as will be apparent.

Without detracting from any of the advantages inherent plastic sheet carriers of the type disclosed and claimed my aforementioned patent, the present invention also provides a covered top for the containers in the packages which is effective in preventing the entry of foreign particles such as dirt and the like and the formation of condensation in and/or around the peripheral bead or rim of the containers.

Referring now in greater particularity to the drawings, and first to the form of invention shown in FIGS. 1–3, it will be seen that the container package 10, as best seen in FIG. 1, comprises a plurality of containers 20 which are secured together by a plastic sheet carrier 30 of the type shown in U.S. Patent No. 2,874,835, the carrier also having a separate handle 40 to facilitate the carrying of the package as well as a plurality of individual plastic shields or cover elements 50 which are in close conforming, overlying relationship to the upper ends or tops of the containers while being united to the carrier member or device 30 in a manner to be presently described.

The containers 20, as shown herein, are of the beverage variety each having a cylindrical side wall 22 and top and bottom cover plates 26, 24 respectively which are joined to the cylindrical side wall 22 in a conventional manner to provide rolled, enlarged peripheral beads or rims 28, 28 at the upper and lower ends thereof. The carrier member 30 by reason of its being made from a resilient, elastic and deformable material with apertures provided therein corresponding in number and location to the desired placement of the containers, but being of smaller peripheral measurement than the container sidewalls, enables material portions surrounding each of the apertures provided in the carrier member 30 to assume the shape of axially extending, embracing portions 32 which underlie the uppermost peripherally enlarged rim or bead 28 of each container in the package to hold the containers as a unit and prevent their withdrawal until separation is desired.

It will be understood that the containers 20 shown in the drawings are merely exemplary of one type of container which may be secured in package form by the carrier device 30, it being understood that bottles and other containers of any desired shape or configuration, and made from any material, may also be held in a package arrangement in a similar manner as above described.

In accordance with an important feature of the present invention, cover elements or shields 50 are deposited or applied on the upper ends 26 of the containers 20 and held in close conforming, overlying relationship to the container upper ends by the axially extending embracing portions 32 of the carrier 30 in various ways, to be described in detail below, to prevent inadvertent separation from the package while enabling the covers or shields to be removed or separated along with the carrier device 30 as containers 20 are removed therefrom.

In the form of invention shown in FIGS. 1–2, the plastic shields or cover elements 50 are deposited by way of a nozzle 60 as seen in FIG. 3 which is connected by suitable valving arrangements to a melted plastic reservoir. Molten plastic 62 issuing from the nozzle 60 is in the form of finely divided, melted particles which form a thin film over the upper ends of the containers and the axially extending embracing portions 32 to unite the plastic shields or cover elements 50 formed thereby to the embracing portions 32 by bonding. Suitable masking guides may be employed beneath the lowermost portions of the axially extending embracing portions 32 to define the areas desired to be covered.

The plastic shields or cover elements 50 are deposited in the above described manner after the assembly of the carrier devices 30 to the containers by any suitable technique. Some examples of assembly methods and apparatus are shown in U.S. Patent Nos. 3,032,943 and 3,032,944. Thus, the diagrammatic representation of the apparatus in FIG. 3 of the drawings is intended to represent the movement of the container packages along a predetermined path by the endless conveyor belt 70, after assembly of carrier members and containers to each other, and the subsequent deposit of the plastic shields or cover elements 50 to form the container package units 10 which are then transported to a packaging area as indicated.

The composite container carrying-cover package 10 thus formed obtains all of the advantages inherent in the plastic sheet carriers 30 as well as provides a covered top for each of the containers in the package. It is to be specifically noted that the cover elements or plastic shields 50 conform in every way to the top and uppermost peripheral bead of each container to create an exceptionally close fitting cover which has not been heretofore available in other covered top carrier devices. Furthermore, by depositing molten plastic in the above described manner, air pockets or formations which would not only be unsightly in appearance, but might permit air to enter between the cover and the tops of the containers, is prevented. At the same time, the uniting of the cover elements or shields 50 to the axially extending embracing portion 32 of the carrier member 30 prevents accidental separation of the covers from the carrier member, while also affording removal of the containers from the package without any interference from the carrier or cover elements.

In its preferred form, the cover elements or plastic shields 50 are individually applied to each container and completely encase or envelope the various portions thereof in a circumferentially continuous manner as best seen in FIG. 1 of the drawings. It is contemplated, however, that the plastic shields or cover elements 50 can be united to the inner peripheral wall surfaces of the axially extending embracing portion 32 rather than the preferred assembly to the outer peripheral wall portion thereof. Further, although the uniting or joining of the plastic shields or cover elements 50 to the axially extending embracing portion 32 is preferably accomplished by the bonding technique described, it is possible to use a separate adhesive substance or other fastening means instead as will be apparent.

It will also be understood that the manner of depositing molten plastic to the container top is not limited to the approach illustrated in FIG. 3 of the drawings. For example, the assembled carriers and containers can be inverted and passed through a molten bath of plastic material to achieve the desired enveloping techniques. Other approaches whereby a molten plastic material is deposited on the upper ends of the containers by the method herein disclosed are also envisioned, and are to be considered as coming within the purview of the present invention.

To further enhance the separability or stripping of the cover element or plastic shield from the containers along with the carrier device, the embodiment as illustrated in FIG. 2 may be employed. It will be recognized that the package 10a shown in FIG. 2 is generally similar to the FIG. 1 container package as indicated by the application of identical reference numerals with the suffix a employed to designate like parts. The modified form of container package shown in FIG. 2 includes a tab element 34 which is integrally joined to each surrounding material portion adjacent the apertures of the carrier member 30 and traverses the same, as illustrated, for underlying the cover elements or plastic shields 50a. The tab elements 34, since they underlie the cover elements or plastic shields 50, thus facilitate stripping or separation of the cover elements as the containers are removed from the package. Other forms of tab elements can, of course, be employed. For example, the surrounding material portions adjacent each of the apertures in the carrier may be provided with one or more radially inwardly directed finger or prong elements which merely overlie the peripheral bead or rim of the containers, but do not extend completely across the tops thereof.

Referring now to FIGS. 4–6 of the drawings, there will be seen a modified form of container package as well as a method and apparatus for producing the modified container package. Identical reference numerals will be used to designate features of the container package which are generally similar to the FIGS. 1 and 2 embodiments with the suffix b employed to delineate the form of package shown in FIGS. 4–5 from that shown in FIGS. 1 and 2. It will be seen that the container package designated 10b in FIGS. 4–5 also includes a plurality of container members 20b which are secured together as a unit by the carrier device 30b, the cover element 50b in this embodiment taking the form of a thin sheet, preferably plastic and transparent in character, which is drawn down over the top and upper peripheral beads or rims of the containers and held in place by the carrier member 30b. In this embodiment then, the cover element comprises a single sheet of thin plastic film which is of a size sufficient to enable drawing of the same in a skin tight condition around the upper ends of the containers by the carrier device 30b in much the same way that a sheet or film is drawn around an object by "skin packaging" techniques. However, the film or sheet is not sealed to a base material as in "skin packaging," but is conformed to the shape of the container upper ends and held in place by the axially extending embracing portions 32b of the carrier device 30b as best seen in FIG. 5 of the drawings. It will be noted that in this form of the invention, the portions of the cover sheet or element 50b overlying each container 20b does not conform in all respects to the shape of the recessed upper end thereof, and is not united by bonding or an adhesive substance to the axially extending embracing portions. It will be recognized, however, that the cover sheet can not be inadvertently separated from the carrier member, and does not interfere by adherence or otherwise, to the containers when removed from the carrier device 30b.

The preferred method and apparatus used to produce the container packages illustrated in FIGS. 4–5 is indicated diagrammatically in FIG. 6 of the drawings. The apparatus 80 shown in FIG. 6 of the drawings is generally of the type disclosed and claimed in U.S. Patent No. 3,032,944 and includes a conveying mechanism 82, preferably of the endless belt variety, which receives the containers 20b issuing from a container filling and closing machine (not shown). Suitable guides 84 overlying the conveyor mechanism 82 are provided at the intake side of the apparatus 80 to aid in directing the containers 20b to the assembly station generally indicated by reference numeral 86.

The carrier members, as manufactured, are joined to each other to form a continuous interconnected strip 88 which is supplied in roll form for feeding into the apparatus. The carrier rolls (not shown) are mounted on suitable supply reels (also not shown) and are directed to the apparatus 80 by suitable idler rolls 90. From the idler rolls 90, the interconnected strip of carriers 88 is fed onto a rotor member 92 which is rotatably mounted, by suitable frame elements, in overlying relation to the assembly station 86. The rotor 92 has mounted thereon a plurality of circumferentially spaced carrier applying elements 94 in the form of expanding shoes which expand the material adjacent the apertures of the carrier members an amount sufficient to enable the assembly of the carriers to the containers at the assembly station 86. The particular manner in which the carrier applying elements 94 expand the material portions surrounding the apertures of the carriers is set forth in detail in U.S. Patent No. 3,032,944, and further detailed explanation is thus unnecessary. Suffice it to say here that the carrier applying elements 94 expand the surrounding material portions adjacent each of the apertures, while pulling the interconnected strip of carriers from the supply roll, to effectuate assembly of carriers to containers at the assembly zone or station 86.

To provide the covered top container package shown in the FIGS. 4–5 embodiment, a supply roll 96 of thin plastic film is mounted, by suitable frame elements, adjacent the intake side of the machine, the plastic material is drawn therefrom over a shaft element 98 to a position where it is located intermediate the carrier strip 88 and the containers 20b prior to assembly with each other at the assembly station 86. In this manner, the carrier strip 88 when assembled to the containers will draw the thin plastic film down over the tops of the containers until it is captured by the axially extending embracing portions 32b of the carriers. Thereafter, separation into individual container packages is accomplished by suitable separating or severing apparatus (not shown) to form the individual package units 10b.

It is important to note that a high degree of control for the thin plastic film is obtained by previously assembled container package units as will be readily apparent. Furthermore, since the thin plastic film is not placed in tension, nor drawn tight around the containers until the assembly is accomplished, there will be little chance for puncturing the plastic film as it is captured by the carrier members. The yieldability of the plastic film also aids in this respect to some extent.

Reference is now made to FIGS. 7–8 wherein a modified form of container package and the method for producing the same is shown. As the container package shown in FIG. 7 is generally similar to the above described embodiments, identical reference numerals will be employed to designate like parts with the suffix c. As will be apparent from an inspection of FIG. 7, the package 10c includes a plurality of containers 20c and a carrier member 30c which are first assembled to each other in the same manner as in the FIG. 1–2 packages. Thereafter, a thin cover sheet 50, of polyethylene, polyethylene-coated paper or the like is placed over the top of the containers 20c as indicated by the phantom lines in FIG. 7 of the drawings, the outer peripheral portions of which are designed, by the placement of the cover sheet 50c, to overhang each of the containers 20c in the package. It is now possible to fold down the outer peripheral portions 52 of the cover sheet 50c pulling them snuggly around the containers and in overlapping relationship to the axially extending embracing portions 32c to which the cover sheet 50c is then united. This is preferably accomplished by heat sealing, fusing or otherwise joining the folded down outer peripheral portions 52 of the cover sheet 50c to the axially extending embracing portions 32c of the carrier member 30c.

One way in which this can be done is to provide a series of pivotally mounted, arcuately shaped heating shoes 100 which can be moved against the outer peripheral portions 52 of the cover sheet 50c as they overlap the axially extending embracing portions 32c. This may be done manually or by any electro-mechanical or hydraulic arrangement as desired. The arcuately shaped inner wall surfaces 102 of each heating shoe 100 is generally complementary to, but slightly larger than the outer peripheral wall surface 22c of the containers to accommodate the cover sheet 50c and the axially extending embracing portions 32c.

Heat is supplied to the pivotally mounted heating shoes 100 by suitable calrod units or the like such that when moved against or adjacent the folded down, outer peripheral portions 52 of the cover sheet 50c, they will unite or join the same to the axially extending embracing portions 32c. The heating shoes 100 are then moved away from the package, and the package is extracted from the vicinity thereof and moved toward the packaging area. In most instances, it is sufficient to unite or join the cover sheet 50c to the axially extending embracing portions which lie in the vicinity of the corner areas of the package. However, it may also be desirable to heat seal or fuse the innermost or intermediate pair of conliners by moving reciprocating heating shoes 104 against part of the outer peripheral portions 52 of the cover sheet 50c and the axially extending embracing portions 32c which partially surround the innermost pair of containers as is seen in FIG. 8 of the drawings. In either case, the cover sheet 50c will be held in close conforming, protective relationship to the upper ends of the containers without the possibility of inadvertent separation, while at the same time enabling simultaneous removal of the carrier member and cover sheet 30c, 50c respectively from the containers 20c as they are separated from the package.

In FIGS. 9–11, a further modified form of container package is shown together with the method of producing the same, and the apparatus used in this connection. Although the package shown in FIG. 9 most closely resembles that illustrated in FIG. 7 of the drawings, it is also generally similar to the other described embodiments as indicated by the application of identical reference numerals with the suffix d employed to designate like parts. In forming the package 10d as illustrated in FIG. 9, the containers 20d and the carrier member 30d are first assembled to each other. Then, a cover sheet 50d is laid on the tops of the containers. In this particular embodiment, the cover sheet 50d is made from paperboard with the undersurface thereof coated with a thin film of polyethylene; however, it will be recognized that films made entirely from plastic or other suitable materials may be used if desired.

The cover sheet 50d is preferably formed, as best seen in FIG. 10 of the drawings, with a series of inwardly extending slots 54 which are so spaced from one another along the periphery of the cover sheet 50d that they will lie intermediate upward extensions of adjacent containers in the package. The slots 54 define a series of perimetrically spaced flanges 56, each of which is adapted to be folded down in at least two discrete locations in juxtaposed, overlying relationship to the axially extending embracing portions 32d of the carrier member 30d. It will be recognized that the outermost flanges 56 on opposite sides of the cover sheet 50d will be folded down at three discrete locations as indicated by the phantom lines in FIG. 10 of the drawings. After the discrete areas of the flanges 56 have been folded adjacent the axially extending embracing portion 32d, the entire package is placed in the apparatus 110 shown in FIG. 11 of the drawings. The apparatus includes a supporting base (not shown) for the package, and a series of laterally reciprocable, generally opposed pairs of heating shoes 112, 114 respectively for the sides and ends of the package. It will be readily observable by an inspection of FIG. 11 of the drawings that the opposed heating shoes 112 are designed to be moved adjacent to or against the perimetrically spaced flanges 56 at the sides of the package while the opposed heating shoes 114 are moved adjacent to or in contact with the perimetrical flanges 56 at the ends of the package. After the heating shoes have been so moved relative to the package, heat supplied therethrough by suitable calrods or the like will heat seal or fuse the vertically extending, folded down portions of the perimetrically based flanges 56 in a manner which will be apparent. Thereafter, the heating shoes are separated from one another, and the completed package 10d is removed from the apparatus 110 and delivered to the packaging area.

From the foregoing, it will be apparent that the present invention contemplates a novel container package as well as methods and apparatus for producing the same which provides many advantages not heretofore available in the prior art. Foremost among the advantages is the adaptation of the novel features herein disclosed to previously developed container packages and the methods and apparatus for their assembly while possessing additional marked advantages thereover as has been discussed.

It will be understood that the invention is not limited to the illustrated embodiments, but includes variants and alternatives within the scope of the invention as defined by the claims.

I claim:

1. The method of producing a covered top container package, comprising the steps of supporting a plurality of containers having enlargements extending from their side walls, positioning adjacent the enlargements of said containers a carrier member of resilient, elastic and deformable material having apertures smaller than, but corresponding in number and location to said containers, relatively inserting said containers axially through said apertures to cause marginal material portions surrounding each aperture to stretch and deform to the shape of axially extending embracing portions for resiliently gripping said containers beneath said enlargements to hold said containers together as a unit, applying cover means to the upper ends of said containers, and securing said cover means in close conforming relationship to the upper ends of said containers by engaging the axially extending embracing portions of said carrier member therewith after assembly of said carrier member to said containers.

2. The method as set forth in claim 1 wherein said cover means is applied by depositing molten plastic on the upper ends of said containers.

3. The method as set forth in claim 2 wherein said molten plastic is deposited on the upper ends of said containers by spraying.

4. The method as set forth in claim 1 wherein said cover means is held in engagement with said axially extending embracing portions by being united thereto.

5. The method as set forth in claim 1 wherein said cover means is applied and held adjacent the upper ends of said containers by placing said cover means on the upper ends of said containers after assembly of said carrier member and containers, and then causing the uniting of at least outer peripheral portions of said cover member to said axially extending embracing portions.

6. The method as set forth in claim 1 wherein said cover means includes perimetrical flanges, said flanges being first folded down adjacent said axially extending embracing portions, and then being united thereto.

7. The method of producing a cover top container package, comprising the steps of supporting a plurality of containers having enlargements projecting from the side walls thereof in substantially abutting, parallel relationship, placing a relatively flexible cover sheet adjacent the upper ends of said containers, positioning in superimposed position above said cover sheet and said containers a carrier member of resilient, elastic and deformable material having a plurality of apertures corresponding in number and location to said containers, but having a smaller peripheral measurement, relatively inserting said containers axially through the apertures of said carrier member to stretch and deform material portions surrounding each aperture for resiliently gripping said containers as a unit and for capturing the flexible cover sheet between said carrier member and said containers, said relatively flexible cover sheet being separately placed adjacent the upper ends of said containers after the superimposition of said carrier member relative thereto and immediately prior to the insertion of said containers axially through the apertures of said carrier member.

8. Apparatus for producing a covered top container package comprising, means for feeding a succession of containers along a predetermined path to an assembly station, means for supplying a flexible sheet in position above the tops of said containers at said assembly station, means for supplying a series of resilient interconnected apertured carrier members to said assembly station in superimposed relationship to said flexible cover sheet, and means for expanding the apertures of said carrier member and assembling the carriers into engaging relation to said containers so as to capture the flexible cover sheet therebetween and provide a covered top container package, said flexible sheet and said series of resilient interconnected apertured carrier members being independently positioned relative to said containers by its respective means only immediately prior to assembly of said carrier members relative to said containers.

References Cited

UNITED STATES PATENTS

| | | | |
|---|---|---|---|
| 3,032,944 | 5/1962 | Hull et al. | 53—48 |
| 3,044,230 | 7/1962 | Fisher | 53—48 X |
| 3,046,711 | 7/1962 | Harrison | 53—48 X |
| 3,137,109 | 6/1964 | Rapata | 53—48 |
| 3,341,354 | 9/1967 | Woods et al. | 117—105.3 |
| 3,360,900 | 1/1968 | Nugarus | 53—140 |

TRAVIS S. McGEHEE, Primary Examiner

R. L. SPRUILL, Assistant Examiner

U.S. Cl. X.R.

53—48, 170